United States Patent [19]

Timmington

[11] Patent Number: 4,510,032

[45] Date of Patent: Apr. 9, 1985

[54] CHAINS

[76] Inventor: David A. Timmington, Shatterford Grange, Shatterford, Arley, Worcester, England

[21] Appl. No.: 638,533

[22] Filed: Aug. 6, 1984

Related U.S. Application Data

[63] Continuation of Ser. No. 478,537, Mar. 25, 1983, abandoned.

[30] Foreign Application Priority Data

Nov. 12, 1982 [GB] United Kingdom ............... 8232420
Mar. 9, 1983 [GB] United Kingdom ............... 8306518

[51] Int. Cl.³ .............................................. C23F 13/00
[52] U.S. Cl. ........................................ 204/197; 59/84; 59/93
[58] Field of Search .................... 204/148, 197; 59/84, 59/85, 78, 93

[56] References Cited

U.S. PATENT DOCUMENTS

| | | | |
|---|---|---|---|
| 2,870,079 | 1/1959 | McCall | 204/197 |
| 3,421,990 | 1/1969 | Penix | 204/197 |
| 3,553,094 | 1/1971 | Scott et al. | 204/286 |
| 3,635,813 | 1/1972 | Drisko et al. | 204/197 |
| 3,803,012 | 4/1974 | Kurr | 204/197 |
| 3,994,794 | 11/1976 | Bohne | 204/197 |
| 4,036,010 | 7/1977 | Hedman | 59/84 |
| 4,089,767 | 5/1978 | Sabins | 204/197 |
| 4,176,033 | 11/1979 | Council | 204/197 |
| 4,187,164 | 2/1980 | Warne | 204/197 |
| 4,216,070 | 8/1980 | Debost | 204/197 |

Primary Examiner—T. Tung
Attorney, Agent, or Firm—C. O. Marshall, Jr.

[57] ABSTRACT

A cathodically protected, studded chain link of theta configuration is provided with at least one anode member (13) provided with a connector (21) for fastening it to the stud (12) of the link to facilitate subsequent renewal of the anode member.

9 Claims, 4 Drawing Figures

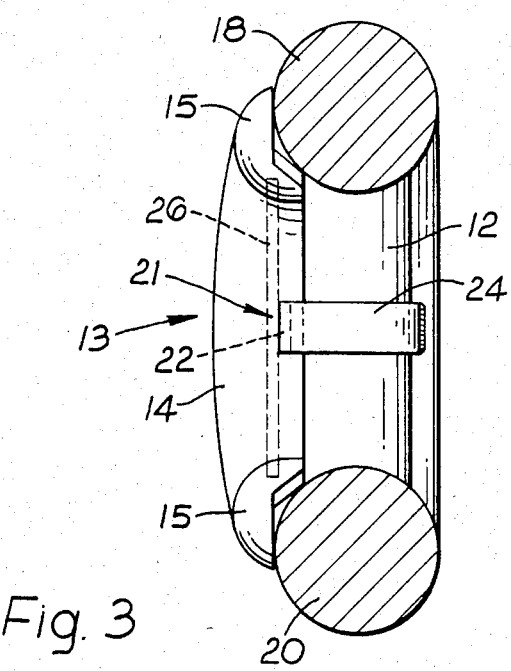
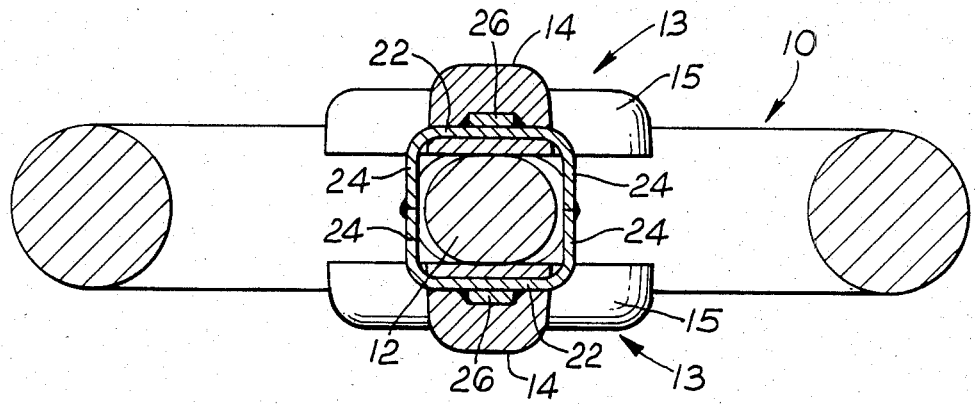

CHAINS

BACKGROUND OF THE INVENTION

This application is a continuation of application Ser. No. 478,537, filed Mar. 25, 1983 now abandoned.

This invention relates to the protection of metal chain links against corrosion and is especially concerned with the protection of chains when used in corrosive environments, e.g. chains used in the mooring of ships and boats.

It is already known from U.S. Pat. No. 3,635,813 to protect chain cathodically by means of consumable blocks of anode material cast on to individual links of chain. It is also known from U.S. Pat. No. 4,216,070 to employ chain of the studded link type in which the entire stud or a concentric outer layer thereof is constituted by anode material. Neither of these possibilities is readily amenable to in situ cathodic protection of previously unprotected chain which is already in use. Nor are they suitable for in situ renewal of anode material after substantial consumption of the existing anode material has taken place.

OBJECTS OF THE INVENTION

One object of the present invention is to provide cathodically protected chain in which the anode material is so applied to the chain as to readily permit its renewal in situ, i.e. without the need to draw the chain out of the water and subsequently replace it after renewal of the anode material.

Another object of the invention is to provide an anode member which can be readily retrofitted to existing chain while the latter is immersed.

SUMMARY OF THE INVENTION

According to the present invention we provide a chain comprising a series of metal chain links, at least some of which are provided with separate anode members composed of a metal whose position in the electrochemical series is such that the anode members will, in corrosive conditions, be consumed in preference to the metal of which the chain links are composed, said anode members being provided with means connecting them to the links so as to enable their removal from the links without breaking or otherwise modifying the links.

Thus, in accordance with the invention, the anode members can be readily fastened to the chain links and subsequently detached for the purposes of replacement. In this manner, renewal of the components may be carried out under water by a diver when the chain is permanently immersed.

In practice, it is envisaged that each link will have at least one of said anode members associated with it thereby ensuring that every link is adequately protected against corrosion. However, it is conceivable that satisfactory corrosion protection may be achievable by providing one or more anode members on individual chain links at spaced intervals over the length of the chain.

The chain is preferably of the type in which each chain link has a transverse stud so that the link is of theta configuration and the stud is preferably integral with the link. A suitable form of link is disclosed in British Pat. No. 1189820 to which reference should be made for further details. In this event, said anode members are preferably detachably connectible to the studs of the chain links. The anode members are conveniently of such a configuration that they overly the studs and also parts of the loop portions of the links.

Each anode member is advantageously of H-shape and is connected to the chain link so that the crosspiece of the H overlies and extends lengthwise of the link stud and the sidepieces of the H each overly portions of the link loop extending each side of the stud, the arrangement being such that the anode member does not encroach upon the spaces enclosed by the link loop and stud or only does so to an insignificant extent.

The connecting means conveniently comprises a pair of legs which project from the anode member and straddle the link stud. Where only one anode member is fastened to each link, the legs are preferably joined together at or adjacent their extremities. In an alternative embodiment, each anode-carrying link may be provided with a pair of anode members in which case the legs of the latter may be joined together to form a loop encircling the link stud.

BRIEF DESCRIPTION OF THE DRAWINGS

Two embodiments of the invention will now be described by way of example only with reference to the accompanying drawings in which:

FIG. 3 is a section across the width of the link/anode assembly;

FIG. 4 is a view similar to FIG. 2 showing a modification in which a pair of anode members are employed.

DESCRIPTION OF PREFERRED EMBODIMENTS

Figure 1:
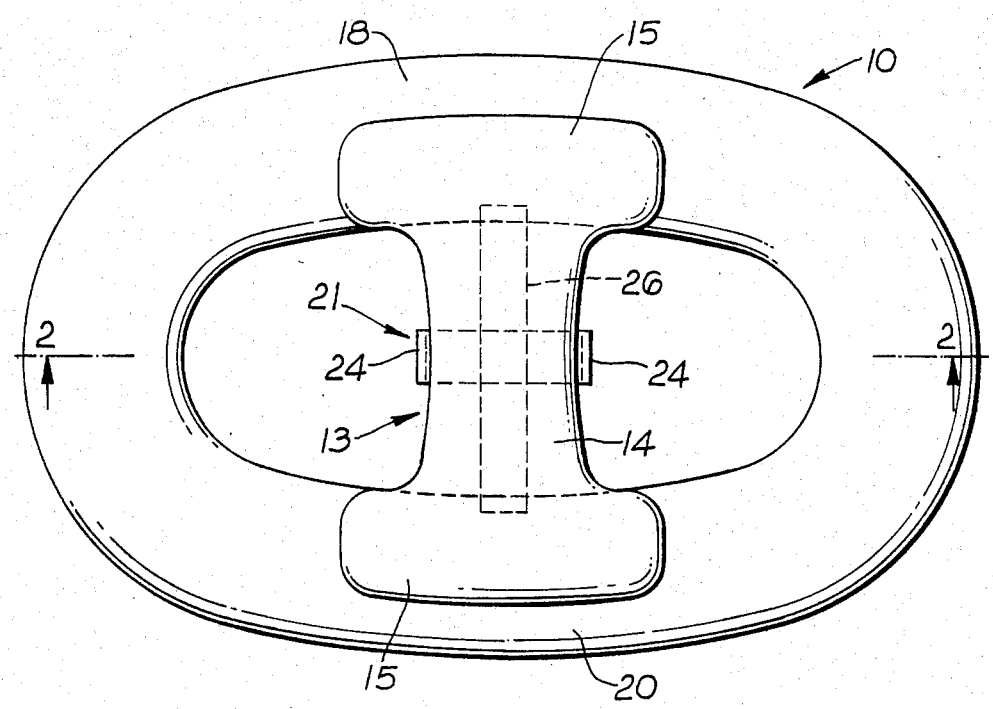
FIG. 1 is a front elevation of one link of a chain, the adjacent links being omitted for the sake of clarity.
Figure 2:
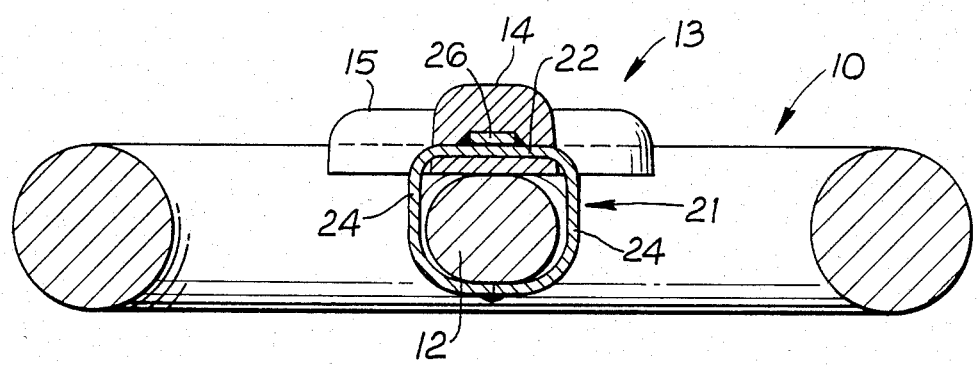
FIG. 2 is a sectional view taken in the direction 2—2 in FIG. 1.

As shown in FIGS. 1 to 3, the chain link comprises a generally oval loop 10 with a median cross piece or stud 12 so that the link resembles the Greek letter "theta". This link may be fabricated from steel rod in accordance with the method disclosed in British Pat. No. 1189820. Attached to the link there is an anode member 13 of generally H-shaped configuration which comprises a crosspiece 14, and sidepieces 15 which contact the opposite sides 18,20 of the link. The crosspiece 14 contacts and may, if desired, be shaped to mate with the adjacent curved surface of the stud 12 of the link. The cross-section of the stud 12 is of lesser width than the cross-section of the oval loop portion 10 and the anode member 13 is shaped so that its crosspiece 14 is received partially within the loop portion 10.

Means are provided for connecting the anode member 13 to the link. Such means comprises a generally U-shaped element 21 having a central portion 22 embedded into the body of the anode member 13 (eg by casting the latter around the former) and projecting leg portions 24 which straddle and embrace the stud 12 and are secured together (as by welding) at or adjacent their extremities to secure the anode member in position. The U-shaped connector element 21 may be a strip of ferrous metal and to ensure that it is firmly anchored to the anode member, the portion 22 is secured (e.g. by welding) to a strip 26 which extends lengthwise of the crosspiece and is wholly embedded in the casting.

FIG. 4 illustrates the connection of two anode members 13 to a studded link. In this case both anode members may be identical to that shown in FIGS. 1 to 3 except that the leg portions 24 are trimmed to a shorter length so that the leg portions of one anode member can be secured end to end (e.g. by welding) to respective leg portions of the anode member on the opposite side whereby the connectors 21 form a loop around the stud 12.

In both embodiments, the thickness of the assembly of stud and anode member(s) is substantially less than the width of the link and the anode members do not encroach at least to any significant extent on the spaces bounded by the loop 10 and stud 12. In this way, the anode members do not interfere with movement of the chain to any appreciable extent.

What I claim is:

1. A chain comprising a series of interconnected metal chain links, each link comprising a loop portion and a transverse central stud, with an opening on each side of the stud, and at least one link comprising at least one anode member composed of a metal which in corrosive conditions is consumed in preference to the metal of which the link is composed, characterized in that the anode member (A) does not interfere appreciably with flexing and running of the chain in that the anode member is in the form of a wafer fitted against one side of a link, said wafer comprising (a) an elongated central portion which fits against an outward facing side of said stud, extends throughout the length of the stud, and has a width not greater than the width of the stud so that it does not encroach on said openings, and (b) two transverse portions, each of which is integral with the central portion, extends on both sides of the central portion substantially beyond the width of the central portions, fits against an outward-facing side of said loop, and does not encroach significantly on said openings, and (B) can be removed and replaced while the chain remains immersed in use, in that said wafer is connected to said link by means comprising a pair of legs projecting from said central portion and extending on both sides of said stud, said legs being composed of metal other than the metal of the anode member.

2. A chain as claimed in claim 1 in which each link has at least one of said anode members associated with it.

3. A chain as claimed in claim 1 in which one or more anode members are provided on individual chain links at spaced intervals over the length of the chain.

4. A chain as claimed in claim 1 in which at least some of the anode-carrying links are each provided with a single anode member having two legs which embrace a portion of the link and are fastened together at or adjacent their extremities.

5. A chain as claimed in claim 1 in which at least some of the anode-carrying links are each provided with a pair of anode members both of which have a pair of projecting legs, each leg of one anode member being fastened to a corresponding leg of the other anode member to form a loop encircling a portion of the link.

6. A chain as claimed in claim 1 in which the connecting means is partially embedded into the wafer of anode material so as to secure the connecting means to the anode member.

7. A chain as claimed in claim 6 in which the pair of legs are integrally joined inside the wafer of anode material and are there secured to a strip which extends within and longitudinally of the central portion of the wafer of anode material.

8. A chain as claimed in claim 1 in which the thickness of the assembly comprising the link stud and the anode member or members attached to the link is substantially less than the width of the link.

9. A chain as claimed in claim 1 in which the crossectional thickness of the link stud is less than that of the link loop and in which each anode member is received at least partially within the loop.

* * * * *